United States Patent
Lindoff et al.

(10) Patent No.: US 9,749,966 B2
(45) Date of Patent: *Aug. 29, 2017

(54) HANDLING OF SIMULTANEOUS NETWORK COMMUNICATION TRANSMISSION AND D2D COMMUNICATION TRANSMISSION

(71) Applicant: Telefonaktiebolaget L M Ericsson (publ), Stockholm (SE)

(72) Inventors: Bengt Lindoff, Bjärred (SE); Gabor Fodor, Hässelby (SE); Muhammad Kazmi, Bromma (SE); Stefan Parkvall, Bromma (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 14/784,266

(22) PCT Filed: Dec. 3, 2013

(86) PCT No.: PCT/EP2013/075415
§ 371 (c)(1),
(2) Date: Oct. 13, 2015

(87) PCT Pub. No.: WO2014/180518
PCT Pub. Date: Nov. 13, 2014

(65) Prior Publication Data
US 2016/0081039 A1   Mar. 17, 2016

Related U.S. Application Data

(60) Provisional application No. 61/821,101, filed on May 8, 2013.

(51) Int. Cl.
H04B 15/00 (2006.01)
H04M 1/00 (2006.01)
(Continued)

(52) U.S. Cl.
CPC ......... *H04W 52/243* (2013.01); *H04W 24/10* (2013.01); *H04W 52/244* (2013.01);
(Continued)

(58) Field of Classification Search
None
See application file for complete search history.

(56) References Cited

U.S. PATENT DOCUMENTS

2002/0090088 A1* 7/2002 Onishi ................. H04L 9/0662
380/268
2004/0240404 A1   12/2004 Ibrahim et al.
(Continued)

FOREIGN PATENT DOCUMENTS

WO   2009/009264 A2   1/2009
WO   2012/049351 A1   4/2012

OTHER PUBLICATIONS

Fodor, G. et al.,"A Distributed Power Control Scheme for Cellular Network Assisted D2D Communications," IEEE 2011 Global Telecommunications Conference (GLOBECOM 2011), Dec. 5, 2011, pp. 1-6, XP032118739, doi: 10.1109/GLOCOM.2011.6133537; ISBN: 978-1-4244-9266-4.
(Continued)

*Primary Examiner* — Moustapha Diaby
(74) *Attorney, Agent, or Firm* — Patent Portfolio Builders PLLC

(57) ABSTRACT

A radio frequency communication device (100) comprising a radio frequency communications interface (130) and a controller (110), wherein said controller (110) is configured to establish network communication with a network node (310) and to establish device-to-device communication with a second radio frequency communication device (325) via said radio frequency communication interface (130). The controller is further configured to determine whether there is
(Continued)

to be performed a simultaneous transmission comprising a network transmission over said network communication with said network node (310) and a D2D transmission over said device-to-device communication with said second radio frequency communication device (325); determine if there is a transmission problem related to said simultaneous transmission; and if so determine a mitigation technique; and perform said network transmission and said D2D transmission according to said mitigation technique to mitigate said transmission problem.

30 Claims, 5 Drawing Sheets

(51) Int. Cl.
| | |
|---|---|
| H04W 40/00 | (2009.01) |
| H04W 72/00 | (2009.01) |
| H04W 74/00 | (2009.01) |
| H04W 52/24 | (2009.01) |
| H04W 52/38 | (2009.01) |
| H04W 76/02 | (2009.01) |
| H04W 24/10 | (2009.01) |
| H04W 52/36 | (2009.01) |
| H04W 16/14 | (2009.01) |
| H04W 52/14 | (2009.01) |
| H04W 72/12 | (2009.01) |
| H04W 88/04 | (2009.01) |

(52) U.S. Cl.
CPC ......... *H04W 52/36* (2013.01); *H04W 52/383* (2013.01); *H04W 76/023* (2013.01); *H04W 76/025* (2013.01); *H04W 16/14* (2013.01); *H04W 52/143* (2013.01); *H04W 72/1215* (2013.01); *H04W 88/04* (2013.01)

(56) References Cited

U.S. PATENT DOCUMENTS

| | | | |
|---|---|---|---|
| 2008/0069039 A1 | 3/2008 | Li et al. | |
| 2009/0017829 A1 | 1/2009 | Laroia et al. | |
| 2009/0046596 A1* | 2/2009 | Ewe | H04W 36/0033 370/252 |
| 2009/0318087 A1* | 12/2009 | Mattila | H04B 1/109 455/63.1 |
| 2010/0093364 A1* | 4/2010 | Ribeiro | H04W 72/082 455/452.2 |
| 2010/0189046 A1 | 7/2010 | Baker et al. | |
| 2011/0255450 A1 | 10/2011 | Wang et al. | |
| 2011/0275382 A1 | 11/2011 | Hakola et al. | |
| 2012/0028663 A1* | 2/2012 | Nejatian | H04W 16/14 455/501 |
| 2012/0122467 A1* | 5/2012 | Auer | H04W 16/10 455/452.1 |
| 2013/0128858 A1* | 5/2013 | Zou | H04W 72/0453 370/329 |
| 2013/0230032 A1* | 9/2013 | Lu | H04W 72/02 370/336 |
| 2016/0066356 A1* | 3/2016 | Lindoff | H04W 52/383 370/329 |

OTHER PUBLICATIONS

Doppler, K. et al., "Device-to-Device Communications; Functional Prospects for LTE-Advanced Networks," IEEE 2015 International Conference on Communications Workshop, Jun. 14, 2009, pp. 1-6, XP031212460; ISBN: 978-1-424-3437-4.

Hongnian, Xing et al., "The Investigation of Power Control Schemes for Device-to-Device Communication Integrated into OFDMA Cellular System," IEEE 21st International Symposium on Personal Indoor and Mobile Radio Communications (PIMRC), Istanbul, Turkey, Sep. 26-30, 2010, pp. 1775-1780, XP031837914, ISBN: 978-1-4244-8017-3.

International Search Report issued in corresponding International application No. PCT/EP2013/075415, date of completion of the search Jul. 25, 2014.

Written Opinion of the International Searching Authority issued in corresponding International application No. PCT/EP2013/075415, date of mailing Jul. 31, 2014.

Fodor, Gábor, et al., "Design Aspects of Network Assisted Device-to-Device Communications," IEEE Communications Magazine, May 2011.

Xiaogang, Ran et al. "D2D Resource Allocation under the Control of BS," University of Electronic Science and Technology of China, 2013, https://mentor.ieee.org/802.16/dcn/13/16-13-0123-01-000n-d2d-resource-allocation-under-thecontrol-of-bs.docx.

Zulhasnine, Mohammad et al. "Efficient Resource Allocation for Device-to-Device Communication Underlying LTE Network," 2010 IEEE 6th International Conference on Wireless and Mobile Computing, Networking and Communications.

Yu, Chia-Hao et al., "Power Optimization of Device-to-Device Communication Underlaying Cellular Communication," in Proceedings of IEEE International Conference on Communications, Jun. 2009, pp. 1-5.

Lee, Namyoon et al. "Power Control for D2D Underlaid Cellular Networks: Modeling, Algorithms and Analysis". JSAC on D2D Communications. May 2013.

Belleschi, Marco et al, "Performance Analysis of a Distributed Resource Allocation Scheme for D2D Communications," GLOBECOM Workshops 2011, pp. 358-362.

Phunchongharn, Phond et al. "Resource Allocation for Device-to-Device Communications Underlaying LTE-Advanced Networks", IEEE Wireless Communication, Sep. 2012.

3GPP, "3rd Generation Partnership Project; Technical Specification Group Services and System Aspects; Feasibility study for Proximity Services (ProSe), Release 12," 3GPP TR 22.803, V12.1.0 (Mar. 2013).

International Search Report issued in related International application No. PCT/EP2013/075400, date of completion of the search May 23, 2014.

Written Opinion of the International Searching Authority issued in related International application No. PCT/EP013/075400, date of mailing Jul. 29, 2014.

International Search Report issued in related International application No. PCT/EP2013/075416, date of completion of the search Mar. 20, 2014.

Written Opinion of the International Searching Authority issued in related International application No. PCT/EP2013/075416, date of mailing Mar. 27, 2014.

* cited by examiner

HANDLING OF SIMULTANEOUS NETWORK COMMUNICATION TRANSMISSION AND D2D COMMUNICATION TRANSMISSION

TECHNICAL FIELD

This application relates to a method, a network node, a communication device, and a computer-readable storage medium for improved handling of simultaneous network communication transmission and D2D communication transmission, and in particular to a method, a network node, a communication device and a computer-readable storage medium for improved handling of simultaneous network communication transmission and D2D communication transmission by mitigating transmission problems in network assisted device-to-device communication networks.

BACKGROUND

The present invention relates to Device-to-Device (D2D) Communications in the Cellular Spectrum. Although the idea of enabling D2D communications as a means of relaying in cellular networks was proposed by some early works on ad hoc networks, the concept of allowing local D2D communications to (re)use cellular spectrum resources simultaneously with ongoing cellular traffic is relatively new. Because the non-orthogonal resource sharing between the cellular and the D2D layers has the potential of the reuse gain and proximity gain at the same time increasing the resource utilization, D2D communications underlying cellular networks has received considerable interest in the recent years.

Specifically, in 3GPP LTE networks, such LTE Direct (D2D) communication can be used in commercial applications, such as cellular network offloading, proximity based social networking, or in public safety situations in which first responders need to communicate with each other and with people in the disaster area.

D2D communication entities using an LTE Direct link may reuse the same physical resource blocks (PRB) as used for cellular communications either in the downlink or in the uplink or both. The reuse of radio resources in a controlled fashion can lead to the increase of spectral efficiency at the expense of some increase of the intra-cell interference. Typically, D2D communicating entities use UL resources such as UL PRBs or UL time slots, but conceptually it is possible that D2D (LTE Direct) communications takes place in the cellular DL spectrum or in DL time slots. For ease of presentation, in the present disclosure we assume that D2D links use uplink resources, such as uplink PRBs in an FDD or uplink time slots in an a cellular TDD system, but the main ideas would carry over to cases in which D2D communications take place in DL spectrum as well.
Simultaneous D2D and Cellular Transmissions in D2D Communications FIG. 3 shows a principal schematic sketch over a network assisted D2D system. One or more network nodes 310 are in control over at least one radio frequency communication device 320, 325 and 327 (also referenced D1, D2 and D3), of which at least two (320 D1 and 325 D2) are also is involved with D2D communication with each other. The network node 310 allocates time-frequency resources for D2D transmission, and is also in control over maximum allowed transmission (TX) power used in the D2D communication. In a typical scenario, the network node 310 allocates D2D resources for approximately 200-500 ms and during that time period, then each radio frequency communication device 320, 325 makes autonomous selections of MCS (modulation and coding scheme) and executes commands such as HARQ (hybrid automatic repeat request). At the end of each time period, the radio frequency communication device 320 reports signal quality status and/or other transmission quality measures, and receives new D2D resources to use for the next time period (i.e. 200-500 ms).

Furthermore, typically UpLink (UL) spectrum/resources are used for D2D, as this is beneficial from an interference control perspective. And, as D2D communication will typically not take up too much of the spectrum resources into account, it is far from efficient to allocate an entire frequency bandwidth in a sub frame for D2D communication. Hence, both UL (and Downlink (DL)) traffic and D2D traffic need to able to share the same sub frames, for example sharing a frequency. This also means that, for optimized spectrum usage, a first radio frequency communication device might be able to transmit to the network node 310 and to a second radio frequency communication device 325 in the same sub frame.

FIG. 5 shows an example of how simultaneous cellular and D2D allocation in the UL can be made. In time block or time period A, the first radio frequency communication device 325 D1 transmits D2D and simultaneously a physical UL control channel (PUCCH) to the network node 310. In time period B, the second radio frequency communication device 325 D2 transmits a physical UL shared channel (PUSCH) to the network node 310 and simultaneously to the first radio frequency communication device 320 D1. In time period C, both the first radio frequency communication device 320 D1 and the third radio frequency communication device 327 D3 transmit a PUSCH respectively to the network node 310. In time period D, the second radio frequency communication device 325 D2 transmits a physical UL shared channel (PUSCH) to the network node 310, while in time period E, the second radio frequency communication device 325 D2 transmit to the first radio frequency communication device 325 D1 in D2D and the third radio frequency communication device 327 D3 transmit a PUSCH to the network node 310.

The performance of multi-channel radio systems in general, and orthogonal frequency division multiplexing (OFDM) systems in particular, can be severely impacted by the interference due to concurrent transmissions on adjacent channels. This is because radiation or "leakage" of energy from adjacent frequency channels can cause significant interference. This ACI can be more severe when the transmission power level on the adjacent channel is high, especially when there is a large imbalance between the transmission levels on adjacent channels. For example, in 3GPP the Adjacent Channel Leakage Power ration (ACLR) is an example of a measurement that can be used to characterize the leakage power problem.
Problems with Existing Solutions The scheduling flexibility requirement desired and discussed above, (namely that a device simultaneously should be able to transmit to a Network node 310 and to another device in the same sub frame) gives rise to the following problems.

One problem is that the total transmission power may not be sufficient for maintaining simultaneous transmission with sufficient quality. Since the radio frequency communication devices of a D2D pair are typically in close proximity to each other, a low transmission power is typically needed in the D2D communication. However, the radio frequency communication device might be far away from the network node 310 and therefore it might need high transmission power for transmission to the network node 310. In fact, D2D communication reusing cellular PRBs is typically expected to take place between radio frequency communication devices that are close to one another but sufficiently far from a network node such as a base station (eNB). Another problem lies in that since the device transmitter or radio frequency communication device's radio frequency interface, especially the power amplifier (PA), is not ideal, due to non-linearities; the transmission on a first set of Resource Blocks (RBs) gives rise to spectral emission on adjacent RBs within the system frequency band.

Another problem lies in that the transmission power imbalance, which is the difference (in logarithmic scale) between the powers transmitted by a radio frequency communication device simultaneously on the D2D transmission and the Network node 310 transmission links, might become too large. This can occur when, for example, the first radio frequency communication device is far from its serving network node but closer to a second radio frequency communication device which the first radio frequency communication device is involved in D2D communication with. This may also occur when, for example, the data rate on the two links differ significantly. A large transmission power imbalance degrades the performance of the weaker link due to leakage of signal transmitted on the stronger link. The radio frequency communication device can handle up to a certain transmission power imbalance.

FIGS. 6A and 6B illustrate a problem that may arise due to this in-band emission. In FIG. 6A, showing a time period A (referring to time period A in FIG. 5), the first radio frequency communication device 320 D1 transmits a PUCCH to the network node 310 (referenced D1→NW) and at the same time also in D2D mode to the second radio frequency communication device 325 D2 (referenced D1→D2). Assuming the PUCCH is transmitted with higher power than the D2D part (due to e.g. path loss differences or different SINR (Signal-to-Noise-and-Interference-Ratio) targets), the D2D transmission may be affected by transmission leakage (referenced LA) from the PUCCH transmission. However, in this case the imbalance is not too large and hence transmission leakage will not significantly affect the D2D transmission. This is exemplified in the D2D signal constellation (below in FIG. 6A) (assuming a QPSK signal is transmitted on one sub-carrier).

However, in FIG. 6B, showing a time period B (referring to time period B in FIG. 5), where D2 is transmitting a PUSCH (referenced D2→NW) at the same time as D2D-communicating with D1 (referenced D2→D1), the transmission leakage (referenced LB) from the network (cellular) transmission severely impacts the D2D transmissions. This is seen in the signal constellation (below in FIG. 6B) where the QPSK points are blurred. The extra noise introduced in the transmitter will make the D2D transmission much more sensitive to interference in D2D reception (RX) at D1, implying a lower D2D performance etc. Since the network scheduler does not have all information about the D2D communication, for instance the distance between D2D and the amount of data transmitted between the devices (and hence transmission power needed), it is hard for the network to detect such transmission (TX) imbalance scenarios.

A simple prior art method to solve this problem is to always avoid scheduling (UL and/or DL) resources to a radio frequency communication device in a same sub frame as ongoing D2D communication. However, as mentioned above, such approach will significantly reduce spectrum usage and spectrum capacity, since in the existing approach only a subset of the frequency resources are utilized within a subframe.

Therefore, there is a need for a method and a radio frequency communication device that takes care of problems as described above without wasting resources.

SUMMARY

The problem, that the inventors has realized after inventive and insightful reasoning and that the present invention aims to solve, arises in situations when a radio frequency communication device in so called network (NW) assisted device-to-device (D2D) mode simultaneously transmits data to both another radio frequency communication device (D2D peer device) and to a network node, such as a cellular base station (BS) or access point (AP). In such situations, large transmission power imbalance may happen, and this is likely to cause problems via, for example, spectral emission in resource blocks (RB) other those RBs that the radio frequency communication device is actually scheduled to transmit in. During simultaneous transmissions in D2D and cellular channels, due to the large power imbalance, severe adjacent channel interference (ACI) may arise. This adjacent channel interference is a new and specific problem in network assisted D2D communications when simultaneous transmission on the D2D link and cellular link is allowed.

It is an object of the teachings of this application to overcome or at least mitigate the problems listed above by providing a radio frequency communication device comprising a radio frequency communications interface and a controller, wherein said controller is configured to establish network communication with a network node and to establish device-to-device communication with a second radio frequency communication device via said radio frequency communication interface. The controller is further configured to determine whether there is to be performed a simultaneous transmission comprising a network transmission over said network communication with said network node and a D2D transmission over said device-to-device communication with said second radio frequency communication device; determine if there is a transmission problem related to said simultaneous transmission; and if so determine a mitigation technique; and perform said network transmission and said D2D transmission according to said mitigation technique to mitigate said transmission problem.

In one embodiment the communication device is a mobile communications terminal.

It is a further object of the teachings of this application to overcome the problems listed above by providing a method for use in a communication device according to above.

It is an object of the teachings of this application to overcome or at least mitigate the problems listed above by providing a network node comprising a radio frequency communications interface and a controller, said network node being configured to serve at least one first radio frequency communication device being configured for both network communication and for device-to-device communication with a second radio frequency communication device, wherein said controller is configured to determine if the first radio frequency communication device has a transmission problem related to said simultaneous transmission for both network communication and for device-to-device communication with the second radio frequency communication device and determine a mitigation technique and transmit said mitigation technique to said first radio frequency communication device.

It is a further object of the teachings of this application to overcome the problems listed above by providing a method for use in a network node according to above.

It is a further object of the teachings of this application to overcome the problems listed above by providing a computer readable medium comprising instructions that when loaded into and executed by a controller, such as a processor, cause the execution of a method according to herein.

The inventors of the present application have realized, after inventive and insightful reasoning, that by enabling a radio frequency communication device to determine if the power imbalance (due to simultaneous transmissions to the peer device and to the Network node 310) will be likely to cause or is currently causing a transmission problem on one or both transmission links and if the radio frequency communication device determines that such a problem can occur in the forthcoming transmission or is occurring in the current transmission, then determining an appropriate solution or mitigation technique (e.g. prioritizing transmissions between D2D transmission and network (cellular)transmission, or directly reducing the difference in the transmission power levels etc). The radio frequency communication device then applies the selected solution during a subsequent data transmission period (e.g. subframe or over certain time period).

The radio frequency communication device applies one or more such solutions autonomously, based on pre-defined rules, or based on a configuration received from the network node or any combination.

One aspect relates to a network node managing a radio frequency communication device, wherein said network node is configured to determine (autonomously or based on information received from the radio frequency communication device) if the power imbalance due to simultaneous transmissions to the peer device and to the Network node 310 will likely cause or is currently causing a transmission problem on one or both transmission links of the radio frequency communication device and if the network node determines that such a problem can occur in the forthcoming transmission or is occurring in the current transmission, then the network node is configured to determine an appropriate solution or mitigation technique (e.g. prioritizing transmissions between D2D transmission and network (cellular) transmission, directly reducing the difference in the transmission power levels etc). Thereafter the network node configures the radio frequency communication device with the information to enable the radio frequency communication device to apply the selected solution during the subsequent data transmission period (e.g. subframe or over certain time period).

The radio frequency communication device may also be configured to report its capability to the network node indicating that it is capable of applying one or more mitigation techniques to avoid or minimize the degradation of the transmissions on one or both links (D2D transmission and network (cellular) transmission) due to transmission power imbalance between the two links due to simultaneous transmission on the two links. The Network node 310 uses this received capability information for one or more radio operational tasks e.g. selection of parameters, selection of appropriate mitigation technique etc.

Other features and advantages of the disclosed embodiments will appear from the attached detailed disclosure.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
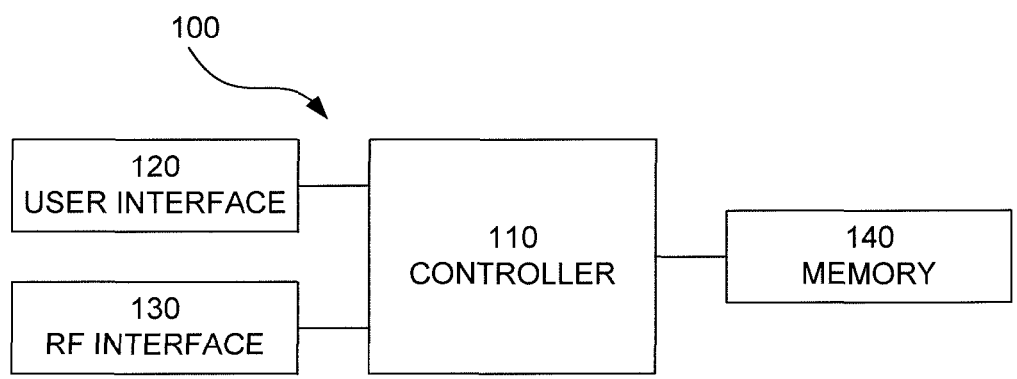
FIG. 1 shows a schematic view of a radio frequency communication device according to one embodiment of the teachings of this application.

FIG. 1 shows a schematic example of a radio frequency communication device 100 according to one embodiment of the teachings herein. In this example, the radio frequency communication device 100 is a mobile communications terminal, such as a mobile phone, a wireless computer tablet or a laptop computer enabled for wireless communication, but it should be noted that the teachings herein are not restricted to be used in mobile communications terminals, but may be used in any radio frequency communication device 100 that is arranged as will be disclosed herein. The radio frequency communication device 100 may comprise a user interface 120, which in the example embodiment of FIG. 1 may comprise at least one physical key, a visual data feedback unit, such as a display or Light Emitting Diode (LED) array. The radio frequency communication device 100 also comprises a controller 110 and a memory 140. The controller 110 may be implemented as one or several processors or other logic circuits, such as programmable logic circuits. The memory 140 may be implemented using any commonly known technology for computer-readable memories such as ROM, RAM, SRAM, DRAM, FLASH, DDR, EEPROM memory, flash memory, hard drive, optical storage or any combination thereof. The memory 140 is used for various purposes by the controller 110, such as for storing program instructions and application data.

The radio frequency communication device 100 further comprises a radio frequency (RF) communication interface 130 which is configured to communicate to one or a combination of the standards Universal Mobile Telecommunications System (UMTS), 3GPP Long Term Evolution (LTE), High Speed Packet Access, HSPA, or Global System for Mobile communication, GSM. It should be noted that the teachings herein may also be implemented using other cellular communications standards. The radio frequency interface 130 is also configured to communicate according to one or a combination of at least one of the standards IEEE 802.11 (WiFi), Bluetooth®, NFC (Near Field Communication) or other short range (radio frequency) communication interface, RFID (Radio Frequency Identification) and Zig-Bee.

The controller 110 is operatively connected to the radio frequency communication interface 130 for communicating with other radio frequency communication devices as will be disclosed below with reference to FIG. 3.

Figure 2:
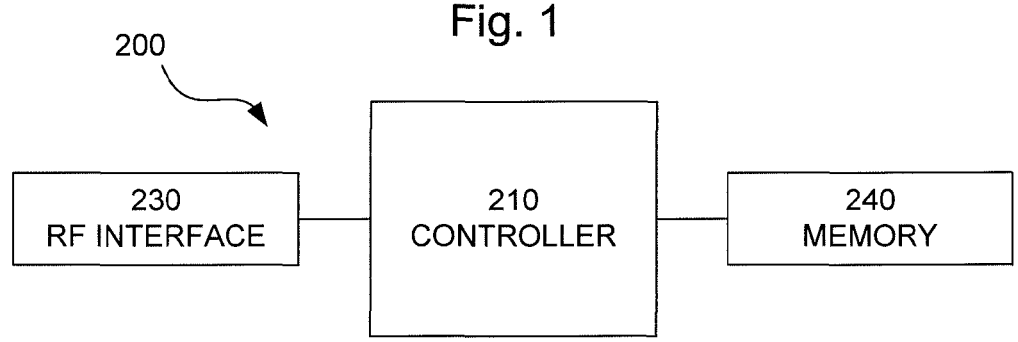
FIG. 2 shows a schematic view of a network node according to one embodiment of the teachings of this application.

FIG. 2 shows a schematic example of a network node 200 according to one embodiment of the teachings herein. In this example, the network node 200 is a base station, but it should be noted that the teachings herein are not restricted to be used in mobile communications networks, but may be used in any network that is arranged as will be disclosed herein. The network node 200 may thus be an access point. The network node 200 comprises a controller 210 and a memory 240. The controller 210 may be implemented as one or several processors or other logic circuits, such as programmable logic circuits. The memory 240 may be implemented using any commonly known technology for computer-readable memories such as ROM, RAM, SRAM, DRAM, FLASH, DDR, EEPROM memory, flash memory, hard drive, optical storage or any combination thereof. The memory 240 is used for various purposes by the controller 210, such as for storing program instructions and application data.

The network node 200 further comprises a radio frequency (RF) communication interface 230 which is configured to communicate to one or a combination of the standards Universal Mobile Telecommunications System (UMTS), 3GPP Long Term Evolution (LTE), High Speed Packet Access, HSPA, or Global System for Mobile communication, GSM. It should be noted that the teachings herein may also be implemented using other cellular communications standards. The radio frequency interface 230 may alternatively be configured to communicate according to one or a combination of at least one of the standards IEEE 802.11 (WiFi), Bluetooth®, NFC (Near Field Communication) or other short range (radio frequency) communication interface, RFID (Radio Frequency Identification) and Zig-Bee, wherein the network node is an access point.

The controller 210 is operatively connected to the radio frequency communication interface 230 for communicating with radio frequency communication devices as will be disclosed below with reference to FIG. 3.

Figure 3:
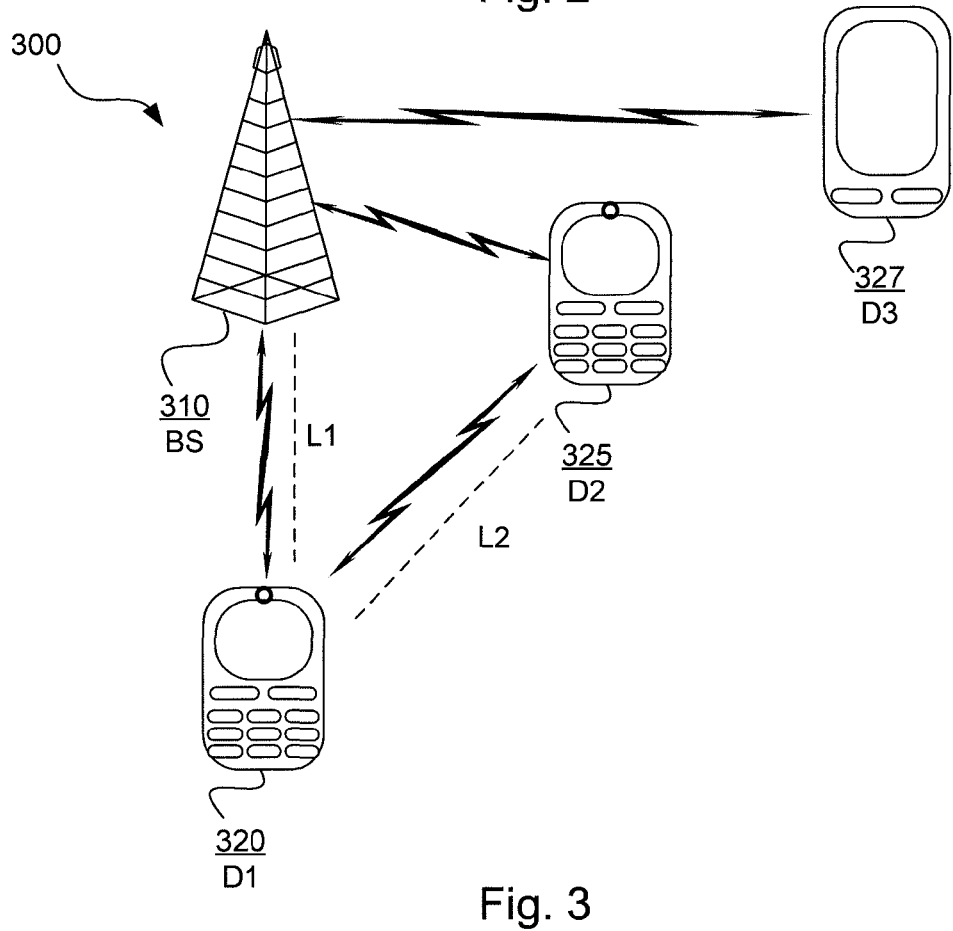
FIG. 3 shows a schematic view of a communication network comprising a communication device according to one embodiment of the teachings of this application.

FIG. 3 schematically shows a radio frequency communication network 300 according to the teachings herein. A network node 310 is arranged to communicate with a first radio frequency communication device 320, such as a user equipment (UE). The network node 310 may be arranged to communicate according to a cellular communication standard, such as LTE (Long-Term evolution) or 3GPP (3rd Generation Partnership Project) or other commonly known radio access technology (RAT), such as disclosed with reference to FIG. 2. The network node 310 is, thus, in this example, a base station (BS). The network node 310 may additionally or alternatively be arranged to communicate according to a data communication standard, such as IEEE802.11 (WiFi™) or Bluetooth™ or other commonly known radio access technology (RAT), such as disclosed with reference to FIG. 2. The network node 310 is, thus, in this example, an access point (AP).

It should be noted that the network node 310 may be arranged to communicate according to any RAT and the teachings herein are applicable in each circumstance. A network node may be an eNode B, a node B, a Base Station, cellular access point (AP), radio network controller, or relay etc. The network node may also be an access point configured to operate according to a non-cellular RAT, such as WiFi and others as disclosed with reference to FIG. 2. The same is also naturally true for the network node 200 of FIG. 2.

The radio frequency communication network 300 may also comprise a second radio frequency communication device 325, such as a user equipment. The first radio frequency communication device 320 is further configured to communicate with the second radio frequency communication device 325 (and vice versa) according to a device to device (D2D) communication standard, such as LTE Direct. The radio frequency communication network 300 is thus arranged for network assisted device-to-device communication, wherein the network node 310 is configured for network assisted device-to-device communication.

As has been explained in the background section, problems arise when a device 320 attempts to communicate both with a network node 310 and another radio frequency communication device 325 at (substantially) the same time.

The radio frequency communication network 300 may also comprise additional radio frequency communication devices, such as a third radio frequency communication device 327. The third radio frequency communication device 327 is only involved in network communication and will thus not be discussed in further detail but it should be noted that the communication effected by the third radio frequency communication device 327 may be a cause of interference or other disturbances that the communication with the first and second radio frequency communication devices 320, 325 is subjected to.

Figure 4:
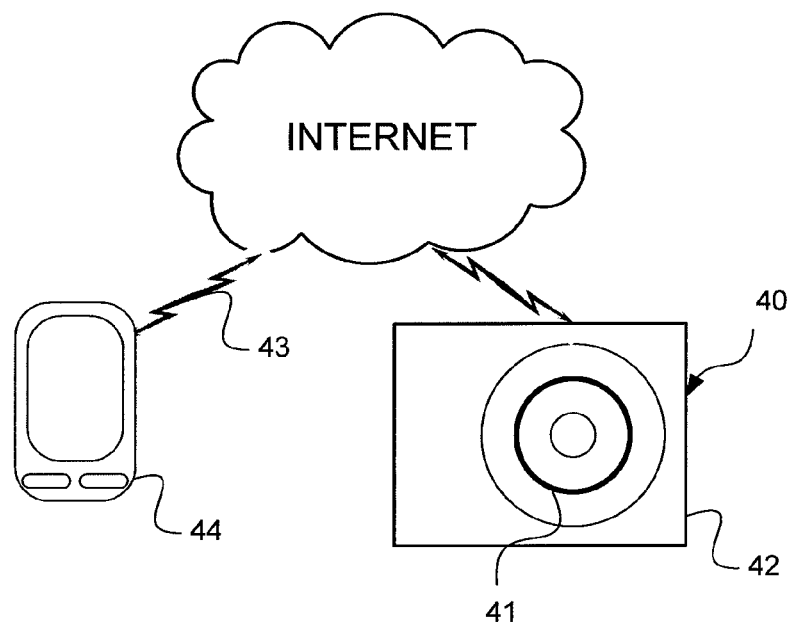
FIG. 4 shows a schematic view of a computer-readable medium according to one embodiment of the teachings of this application.
Figure 5:
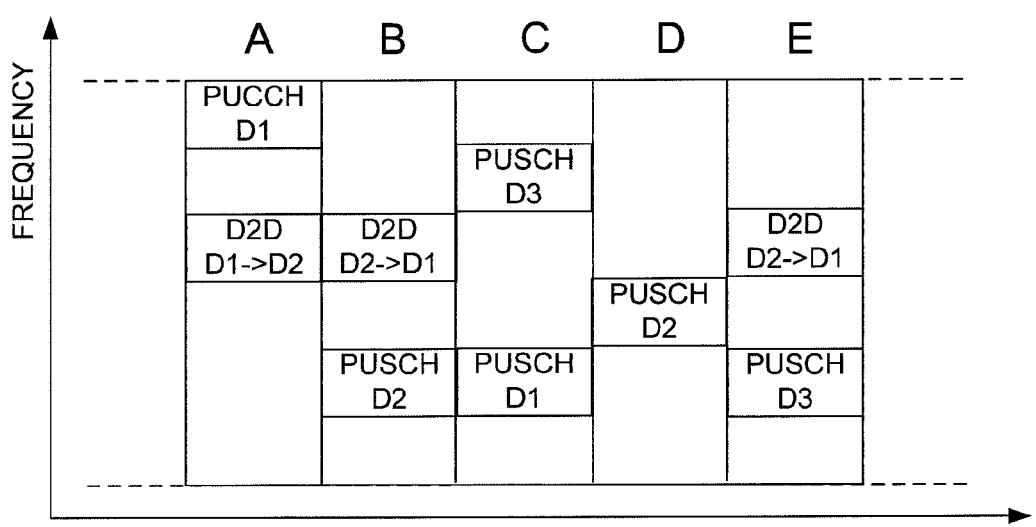
FIG. 5 shows series of time blocks for a radio frequency communication device transmitting both to a network node and to another radio frequency communication device according to an embodiment of the teachings of this application.
Figure 6B:
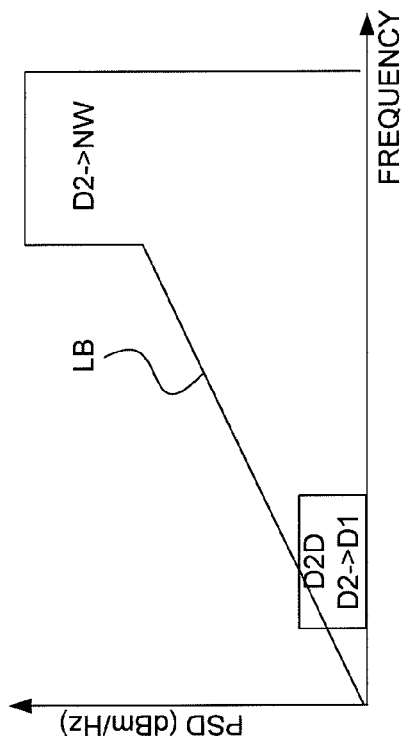
FIGS. 6A and 6B illustrate a problem occurring in the prior art.
Figure 6B:
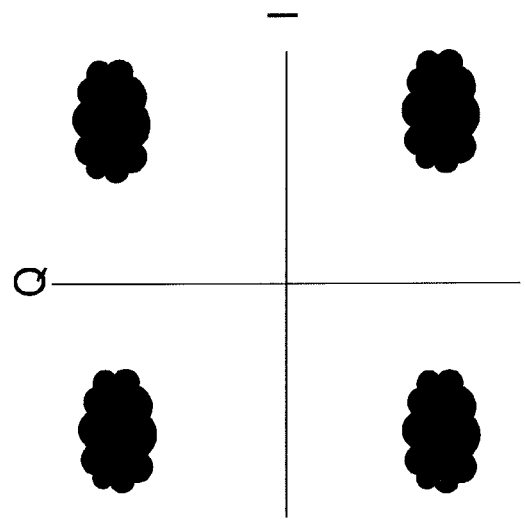
Figure 6A:
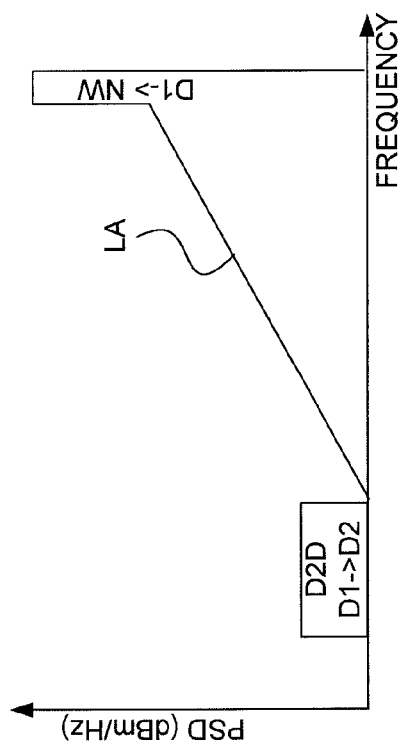
Figure 6A:
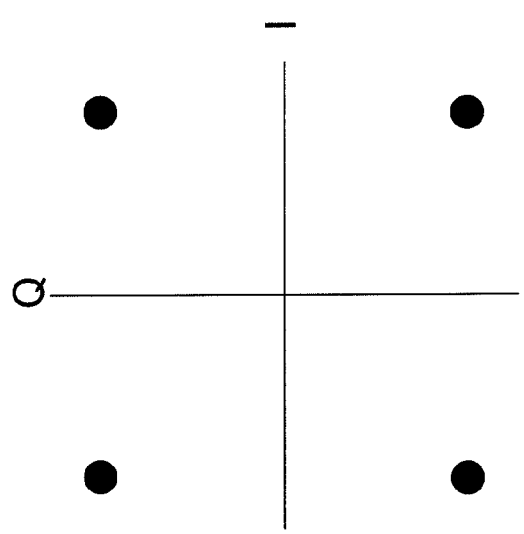

FIG. 4 shows a schematic view of a computer-readable medium as described in the above. The computer-readable medium 40 is in this embodiment a data disc 40. In one embodiment the data disc 40 is a magnetic data storage disc. The data disc 40 is configured to carry instructions 41 that when loaded into a controller, such as a processor, executes a method or procedure according to the embodiments disclosed above. The data disc 40 is arranged to be connected to or within and read by a reading device 42, for loading the instructions into the controller. One such example of a reading device 42 in combination with one (or several) data disc(s) 40 is a hard drive. It should be noted that the computer-readable medium can also be other mediums such as compact discs, digital video discs, flash memories or other memory technologies commonly used.

The instructions 41 may also be downloaded to a computer data reading device 44, such as a computer or other device capable of reading computer coded data on a computer-readable medium, by comprising the instructions 41 in a computer-readable signal 43 which is transmitted via a wireless (or wired) interface (for example via the Internet) to the computer data reading device 44 for loading the instructions 41 into a controller. In such an embodiment the computer-readable signal 43 is one type of a computer-readable medium 40.

The instructions may be stored in a memory (not shown explicitly in FIG. 4, but referenced 240 in FIG. 2) of the radio frequency communication device 100.

References to computer programs, instructions, code etc. should be understood to encompass software for a programmable processor or firmware such as, for example, the programmable content of a hardware device whether instructions for a processor, or configuration settings for a fixed-function device, gate array or programmable logic device etc.

Figure 7:
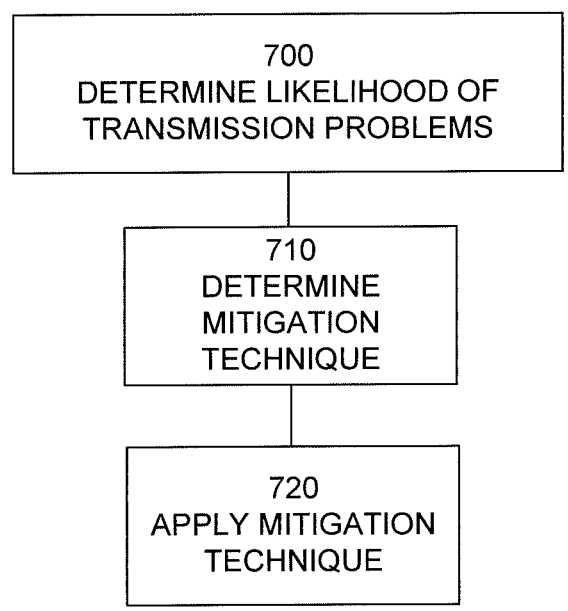
FIG. 7 shows a flow chart for a general method according to an embodiment of the teachings of this application.

FIG. 7 shows a general method according to the teachings herein. The first radio frequency communication device 320 determines 700 if a power imbalance (due to simultaneous transmissions to the peer device and to the Network node 310) will be likely to cause or is currently causing a transmission problem on one or both transmission links. If the radio frequency communication device 320 determines that such a problem can occur in the forthcoming transmission or is occurring in the current transmission, then the radio frequency communication device 320 determines 710 an appropriate solution or mitigation technique. The radio frequency communication device 320 may be configured to determine that the mitigation technique should involve prioritizing transmissions between D2D transmissions (D2D transmission) and network transmissions (network (cellular) transmission). Additionally or alternatively, the radio frequency communication device 320 may be configured to determine that the mitigation technique should involve directly reducing the difference in the transmission power levels. Also, other mitigation techniques are plausible. As a mitigation technique has been determined, the radio frequency communication device 320 then applies 720 the selected solution or mitigation technique during a subsequent data transmission period (for example during a next subframe or over certain time period).

The radio frequency communication device 320 may be configured to apply one or more such mitigation techniques autonomously, that is by its own accord. Additionally or alternatively, the radio frequency communication device 320 may be configured to apply one or more such mitigation techniques based on pre-defined rules. Additionally or alternatively, the radio frequency communication device 320 may be configured to receive a configuration from the network node 310 and to apply one or more such mitigation techniques based on a received configuration. Combinations of how the radio frequency communication device 320 applies the mitigation techniques are of course possible. In one embodiment the radio frequency communication device 320 may be configured to also or alternatively receive other information associated with the mitigation technique than a configuration from the network node 310 and to apply a mitigation technique accordingly. One example of such associated information is predefined identifiers for a mitigation technique or timing issues or indicators for when to use a mitigation technique.

Figure 8:
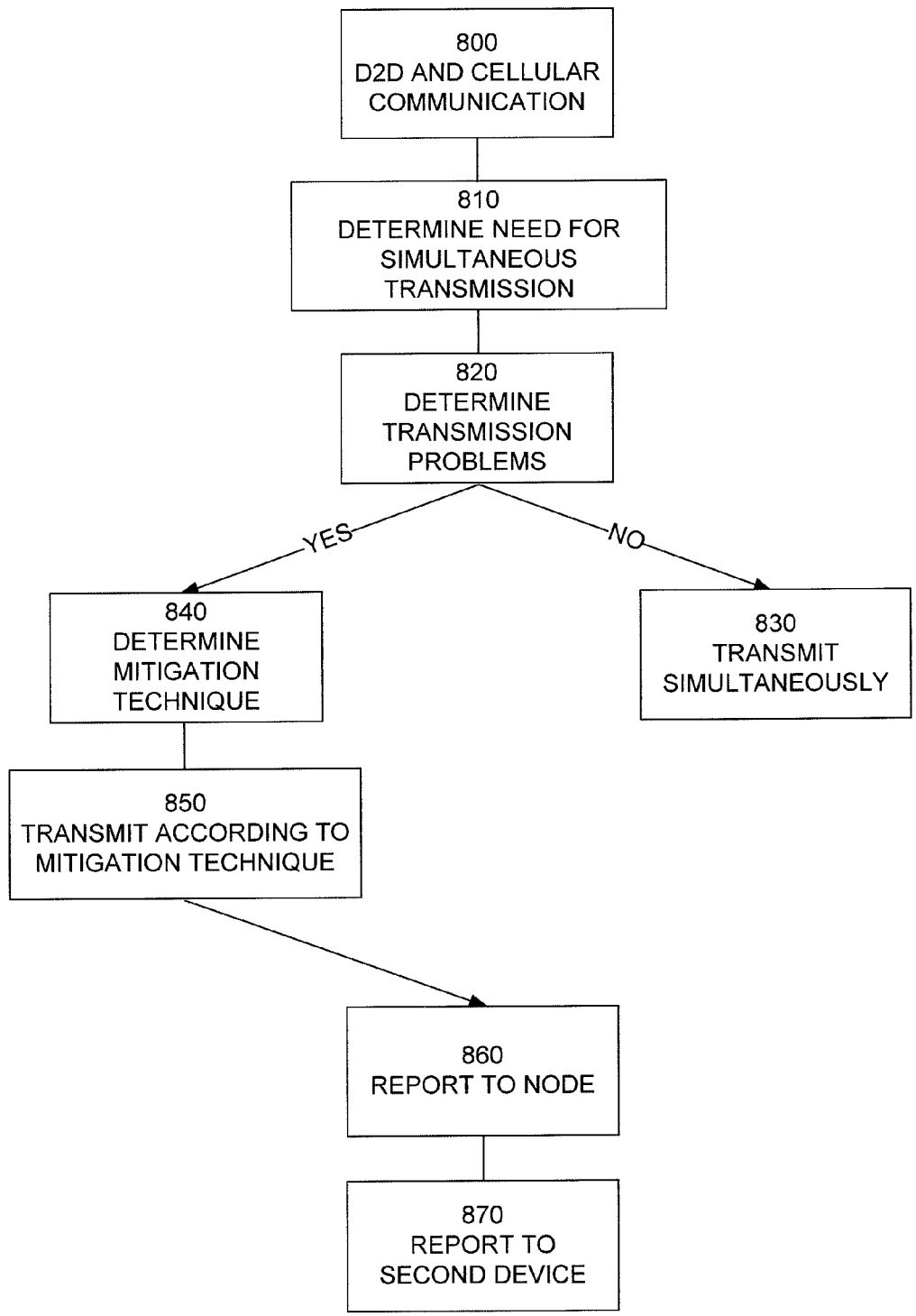
FIG. 8 shows a flow chart for a general method according to an embodiment of the teachings of this application.

Referring to FIG. 8, being a flowchart for a general method according to the teachings herein, a radio frequency communication device 320 is connected 800 to a network node for network (cellular) communication as well as being in communication with a second radio frequency communication device over a D2D link. In some embodiments the same frequency band (DL/UL resources, DL/UL band) are used for network (cellular) communication and D2D communication. In some embodiments the D2D (time/frequency) resources may be pre-allocated for a time period by a network node 310 controlling the first radio frequency communication device 320. The radio frequency communication device 320 may also be configured to receive scheduling grants from the network node 310, giving an indication that a DL/UL transmission to the network node 310 is needed. It should be noted that although the description herein is aimed at UL communication, it can also be applied to DL communication.

The UL communication can be a data channel (e.g. PUSCH in case of LTE) or a control channel (e.g. PUCCH in case of LTE). The radio frequency communication device 320 determines that the device is scheduled for a D2D transmission and a network (cellular) transmission in the same sub frame 810, possibly in different frequency resources. The detection may be done by determining a request, via a scheduling grant from the network node 310, to send UL information in a sub frame where the radio frequency communication device 320 should transmit to the second radio frequency communication device 325 in the D2D communication. A first set of resources is allocated to network (cellular) transmission and a second set of resources is allocated to the D2D transmission. A controller 110 of the radio frequency communication device 320 determines 820 whether there will be any problem associated with the simultaneous transmission.

Different problems may be expected. For instance, if the transmission power imbalance is larger than a threshold, this indicates that there is a risk for transmission leakage problem, as described above. It could also be detected that the transmission power level is above another threshold making simultaneous transmission complicated (due to the first and second set of resource allocation or the amount of resources allocated to respective transmission). Also, the total transmission power needed may be above maximum possible transmission power (for example 24 dBm). If no problem is detected, the radio frequency communication device 320 performs simultaneous transmission 830 on the two links.

However, if a problem is detected the radio frequency communication device 320 determines or selects one or more mitigation techniques for solve the detected problem(s) 840. The selected mitigation technique(s) is then applied 850 by radio frequency communication device 320.

In general, in response to detection of transmission power imbalance, the mitigation technique applied by the radio frequency communication device 320 comprises at least one of: the prioritization between transmissions on D2D transmission and network (cellular) transmission, restricted transmission on D2D transmission, network (cellular) transmission or both links, or an adjustment of transmission power of signals transmitted on the D2D transmission and/or network (cellular) transmission links.

There are several more possible mitigation techniques and variants which will be discussed in detail below.

A first general mitigation technique is to prioritize between device-to-device transmission (D2D transmission) and network (or cellular) transmission (network (cellular) transmission). The radio frequency communication device 320 is thus configured to prioritize transmitting either the D2D information or the network (cellular) information. The radio frequency communication device 320 may be configured to prioritize a transmission by setting the other transmission's transmitting power (TX) to very low value or (substantially) zero watt, or in other words to disable it. The radio frequency communication device 320 may be configured to prioritize based on prioritizing control data over other data, such as voice, or prioritizing network (cellular) communication over D2D communication. The radio frequency communication device 320 may also or alternatively be configured to prioritize based on a significance or criticality of the information or data being transmitted over one of the two links, i.e. the D2D transmission or network (cellular) transmission links. One example relates to retransmission schemes, where, if n>m, a retransmission with number n of data in one link has a higher priority than a retransmission with number m on the other link to enable that the data having been retransmitted many times is successfully transmitted. Another example is that acknowledgment messages can be considered to be more critical than data messages as if an acknowledgment message is corrupted this will automatically lead to a retransmission, increasing the traffic, whereas a corrupted data message may be decodable or in some cases a retransmission would not be necessary in any case. This approach may be used especially when the radio frequency communication device is power limited (i.e. the total transmission power is above total possible transmitting power so an increase in transmitting power for one channel is not possible and a reduction in transmitting power for the other channel would only result in a failed transmission).

A second general mitigation technique relates to adapting the transmitting power (transmission power). One alternative is to scale the transmission power. This approach is suitable in case the maximum total transmission power has been reached. In this case, one scaling approach may be to scale the D2D power first until it reaches 0 (i.e. as above) and followed by cellular communication power scaling according to legacy rules (i.e. 3GPP specification in case of LTE system).

Another alternative is to adjust the transmission power. The radio frequency communication device is configured to adjust the transmission power level on one transmission such that the problem is solved. For instance it may increase the transmission power on D2D or decrease on network (cellular) communication if the transmission imbalance is too large (and network (cellular) communication requires high transmission power). The power adaption may be done according to pre-allocated rules or be based on a configuration signaled form the controlling network node or combination thereof as explained above.

A third general mitigation technique relates to restricting the transmission. The radio frequency communication device 320 may be configured to only transmit a fraction or portion of one of the data links, for example, the network (cellular) communication information. To illustrate, if the network node 310 transmits an uplink grant for a data channel transmission (e.g. PUSCH) which includes uplink feedback information (e.g. HARQ (Hybrid Automatic Repeat request), PMI (Pre-coding Matrix Indicator), CQI (Channel Quality Information) information etc), the radio frequency communication device 320 may instead transmit a control channel (e.g. PUCCH, Physical Uplink Control CHannel) including only the uplink feedback information (e.g. HARQ and CQI information etc) or even selected uplink feedback information (e.g. only HARQ). This reduces the data to be transmitted and thereby reduces the risk of ACI (Adjacent Channel Interference) corrupting a transmission. In an alternative (or additional) embodiment the radio frequency communication device 320 is configured to only transmit on a subset of the allocated resource blocks to the network node, for example, the radio frequency communication device 320 only transmits on 5 RBs instead of 10 RBs. A similar approach may be applicable by restricting D2D communication instead. To illustrate with an example for the D2D transmission link, the radio frequency communication device 320 may transmit only essential control signals such as CSI (Channel State Information), radio measurements, HARQ feedback etc. The radio frequency communication device 320 may later resume normal operation (i.e. no restricted transmission) when transmission power imbalance falls back in the normal operating range e.g. less than say 20 dB.

A fourth general mitigation technique, which is related to the second mitigation technique above, relates to alternating the transmission power adjustment. The radio frequency communication device 320 is configured to decrease the transmission level of one transmission and increase the transmission level of the second transmission such that the transmission power difference between the two transmissions falls below a given threshold, for example 20 dB or less. This simultaneous transmission power level adjustment also triggers adjustment of the applied MCS in both transmissions. For example on the link where the radio frequency communication device reduces transmission power uses more robust MCS scheme e.g. QPSK instead of 16 QAM and/or lower code rate such as ⅓ instead of ½. This will facilitate the decoding of the transmitted signal by the network node 310 or by the second radio frequency communication device 325. The radio frequency communication device 320 may also restrict or adjust the MCS within a pre-defined or pre-configured set of MCS allowed when transmission power imbalance exceeds a threshold, for example 20 dB or more.

Of course, the mitigation techniques can also be combined into a composite mitigation technique where the radio frequency communication device 320 applies any combination of the mitigation techniques described above. The composite technique may be applied when certain conditions are met for example indicating a more severe transmission imbalance that might require greater actions to overcome. For example, such as when the transmission power imbalance is above a second threshold of 25 dB or more. In this case the transmission power imbalance can be reduced to normal level by applying multiple techniques e.g. restricted transmission and also transmission power adjustment.

Some explicit example embodiments of D2D transmission power adjustment rules will be shown below. We introduce the following variables.

$P\_cell$ is the cellular total transmission power needed in a sub frame as given by the current 3GPP specification (i.e., sum of powers of PUSCH, PUCCH, etc).

$P\_d2d'(channel)$ is the D2D transmission power for a given (physical) channel/signal, as given by D2D power control formula used for the D2D communication.

$\Sigma(P\_d2d')$ is the total D2D transmission power (all direct channels/signals) as given by other D2D power control formulas. The embodiments of invention cover the case of having multiple D2D (physical) channels in the D2D communication.

$P\_off$ is the max in-device power offset between D2D and cellular transmission. It could be a function of device design (i.e. device capability) or a configured parameter, configured for instance by the NETWORK NODE 310.

$\epsilon$, epsilon is a dropping threshold, when the channel is not transmitted.

$P\_max$ is the max transmission power (e.g. 24 dBm).

According to a first example embodiment, the radio frequency communication device 310 is configured to set the D2D transmission power for all D2D channel according to:

$$P\_d2d=\max(P\_d2d', P\_cell-P\_off).$$

According to a second example embodiment, the radio frequency communication device 310 is configured to set the D2D transmission power per D2D channel:

$$P\_d2d(channel)=\max(P\_d2d'(channel), P\_cell-P\_off).$$

According to a third example embodiment, the radio frequency communication device 310 is configured to set the D2D transmission power by taking max transmission power into account:

$$P\_d2d=\min(\max(\operatorname{sum}(P\_d2d'), P\_\text{cell}-P\_\text{off}); P\_\max-P\_\text{cell}).$$

According to all example embodiments, the radio frequency communication device 310 is configured to drop transmission of the D2D channel if sum(P_d2d) or sum(P_d2d')+P_cell<ϵ.

It should be noted that these are just example embodiments, and the teachings of this application covers other approaches as well.

The above mitigation techniques (e.g. prioritization, transmission power adjustment etc) can be evaluated and applied for transmission by the radio frequency communication device 320 during one transmission time interval (TTI) or during multiple TTIs or for certain time period.

Returning to FIG. 8 which shows a flowchart for a general method according to the teachings herein, which can be seen as an extension of the flowchart of FIG. 7. The radio frequency communication device 320 first determines 800 if it is communicating both over a D2D communication link and a network (cellular) link. Then the radio frequency communication device 320 determines 810 if there is a need for simultaneous transmission over the two links. If there is no need for simultaneous transmission there will be no transmission problems related to such simultaneous transmission. The radio frequency communication device 320 is further configured to determine 820 if there are or if it is likely that there will be transmission problems during the simultaneous transmission, as has been discussed in the above. If no such problems exist or are likely to occur, the radio frequency communication device 320 is configured to transmit 830 simultaneously without adapting or restricting, using current scheduling and transmission policies.

If such problems exist or are likely to occur, the radio frequency communication device 320 is configured to determine 840 a mitigation technique and thereafter transmit 850 simultaneously according to the determined mitigation technique. As has been disclosed above there are many alternatives how to determine a mitigation technique and also many alternatives for the mitigation techniques, including combinations of such mitigation techniques.

Alternatively, the radio frequency communication device 320 may also be configured to report 860 the mitigation technique, such as any adjustments, or the detected problem to the network node 310 that may take this into further consideration in the forthcoming scheduling of data to/from the radio frequency communication device 320.

Additionally or alternatively, the first radio frequency communication device 320 is also configured to report 870 any adjustments or detected problem(s) to the second radio frequency communication device 325. The reporting may be performed after the mitigation technique has been implemented. The reporting may also or alternatively be performed before the mitigation technique has been implemented The radio frequency communication device 320 can be configured to provide the mitigation techniques in a number of manners. And, one or more manners to mitigate the problem caused by transmission power imbalance can be applied or their application can be ensured by using any of the following.

One manner is to utilize pre-defined rules. The radio frequency communication device 320 may be configured to consult a set of pre-defined rules, which specifies the mitigation techniques in the standard. For example the mitigation techniques can be pre-defined along with certain conditions and also the corresponding parameters e.g. threshold in terms of transmission power imbalance, contents of the data or type of the data on the two links, set of allowed MCS, etc. For example it may be pre-defined that the radio frequency communication device 320 may apply the first pre-defined rule (Prioritization between D2D transmission and network (cellular)transmission) provided the transmission power imbalance is above a first threshold e.g. 25 dB. In addition to the condition to trigger this method, the duration and time period over which the pre-defined rules shall apply can also be pre-defined.

Another manner is to enable the network to configure the mitigation techniques. The mitigation techniques are then configured by the network node 310 serving, controlling or managing the radio frequency communication device operation. For example the network node 310 may configure the radio frequency communication device 320 to apply one or more methods to mitigate the impact of transmission power imbalance. The radio frequency communication device 320 would be configured to receive a mitigation configuration from the network node 310 and to adapt its transmissions accordingly. Furthermore, the network node 310 may be configured to initiate a procedure to apply the mitigation technique(s) in response to detecting the transmission power imbalance problem. For example the network node 310 may receive from the radio frequency communication device an explicit indication that transmission power imbalance is causing problem or transmission power imbalance report or results, and in response thereto provide the radio frequency communication device 320 with a mitigation configuration to be used accordingly.

The network node 310 may also or additionally be configured to autonomously determine that the transmission power imbalance is above a threshold or other ways such that it is likely to cause problems during transmission. The network node 310 may base the transmission imbalance determination on a type of transmissions or the data rate on the two links. The network node 310 may also base the transmission imbalance determination on the location of the radio frequency communication device 320 with respect to the location of the network node 310 and/or with respect to the location of the second radio frequency communication device 325 involved in D2D communications.

The network node 310 may also be configured to configure additional parameters such as an allowed set of MCS, time periods or TTIs during which the radio frequency communication device 320 needs to apply the mitigation technique, a transmission power imbalance threshold above which the radio frequency communication device 320 is allowed to apply one or more mitigation technique. The network node 310 is also configured to transmit such parameters to the radio frequency communication device 320 to be used accordingly.

The network node 310 may also or additionally be configured to configure the radio frequency communication device 320 using higher layer signaling such as radio Resource Control (RRC) or lower layer signaling such as L1 control channel or a Media Access Control (MAC) command or combination thereof (e.g. partly via RRC and remaining via MAC).

One manner is that the mitigation should be radio frequency communication device implementation specific. In this manner the radio frequency communication device 320 applies one or more of the mitigation techniques autonomously without interaction from the network node 310. However, the radio frequency communication device 320 may also optionally inform the network node 310 and/or the second radio frequency communication device 325 involved in D2D communication about the mitigation technique it is applying or intend to apply.

It should be noted that the above manners may be combined, all of them or any of them. To illustrate with an example, one or more mitigation techniques can be pre-defined as stated above. However the radio frequency communication device 320 may be configured to only be allowed to apply one or more such techniques when explicitly permitted or configured by the network node 310. In turn, the network node 310 may permit the radio frequency communication device 320 to use certain pre-defined rule based on one or more criteria e.g. transmission power imbalance, type of transmissions in the two links, criticality of transmissions on the two links etc. For example the Network node 310 receives information about the transmission power imbalance or related problem (e.g. degradation due to power leakage to weaker link: D2D transmission or network (cellular) transmission) at the radio frequency communication device. If the problem is severe (e.g. transmission power imbalance is above 20 dB) and the information transmitted on network (cellular) transmission is not urgent or critical then the network node may indicate to the radio frequency communication device to apply the mitigation technique of prioritizing between D2D transmission and network (cellular) transmission, by transmitting on D2D transmission with higher priority.

The radio frequency communication device and/or the network node 310 may also be configured to update the prioritization rule dynamically. The network node 310 may update the priority rule each mode selection period (which for instance may be 200-500 ms). Alternatively or additionally, the network node 310 may update the priority rule upon a detected event or condition. The event or condition and corresponding thresholds can be pre-defined or implementation specific.

One example of such an event is when a measurement report (e.g. signal quality (e.g. RSRQ), signal strength (e.g. RSRP), SINR, SNR, BLER, BER etc) performed by a radio frequency communication device (e.g. on D2D RX) involved in the D2D communication differs from a certain threshold. The network node 310 receives such reports from the radio frequency communication device. For example in one event it is above a first threshold. In a second event it is below a second threshold. The event may also be triggered by a measurement report performed by a second radio frequency communication device 325 connected to the network node 310.

Another example of such an event is when a measurement report (e.g. signal quality, signal strength, SINR, SNR, BLER, BER etc) performed by the network node 310 (e.g. on signal transmitted over the network (cellular) transmission link) differs from a certain threshold. For example in one event it is above a first threshold. In a second event it is below a second threshold.

The event may also be triggered by a measurement report performed by the network node 310 on signal transmitted by a second radio frequency communication device 325 over its network (cellular) transmission link.

Another example of such an event is when the cell load in a cell being served by the network node 310 changes, such as when the transmitted power differs from a threshold, the total resource usage (e.g. percentage of usage of UL and/or DL resource blocks) differs from a threshold, the number of users in a cell differs from a threshold, the number of users with D2D communication using network (cellular) transmission, and/or the number of users with simultaneous D2D reception and network (cellular) transmission etc. For example, if the cell load is high, then the network node 310 initiates one or more rules or change their priority order. If the upload cell load is above a threshold (i.e. based on one or more criteria such as UL resource usage etc), then the network node 310 may increase the priority of the rule such that both transmission power adjustment and discontinuous reception at the D2D reception link are of highest priority.

Another example of such an event is when a change of a state in any of the involved devices is detected. Examples of state changes are a cell change, a handover, a RRC (Radio Resource Control) connection re-establishment, a reconfiguration of connection, any of configuration, reconfiguration, activation or deactivation of one or more secondary cells (SCell) in CA, changing RRC states (e.g. from IDLE state to RRC connected or vice versa etc), configuration or reconfiguration or activation or deactivation of radio links involved in Coordinated MultiPoint transmission (CoMP), power state in the device from ON to OFF (or vice versa).

Another example of such an event is when a change in a network node status is detected. Examples of such states are bi-states like a high load in the served cell, low load in the served cell, tri-state like high load, medium load or low load in the served cell, or power state of the network node 310 changing from ON state to OFF state due to power saving, maintenance activity etc.

It should be noted that the events disclosed in the above may also be combined into combination events. The network node 310 may use any combination of the events to update the priority of the rules. For example the network node 310 may only change the current priority order of the rules provided all events are detected.

All D2D capable radio frequency communication devices 320 may not be capable of detecting the transmission power imbalance problem and of applying one or more mitigation techniques to alleviate this problem. Therefore, the radio frequency communication device 320 may be configured to report its capability to the network node 310 (e.g. eNode B, BS, network controller, relay, core network node, Mobility Management Entity (MME), positioning node etc) indicating that it is capable of at least applying one or more solutions or mitigating techniques to eliminate or at least minimum the impact of any transmission power imbalance due to simultaneous D2D and network (cellular) transmissions. The radio frequency communication device 320 may also signal additional information as part of the capability. The additional information may indicate whether the radio frequency communication device 320 is also capable of detecting a transmission power imbalance problem due to simultaneous D2D and network (cellular) transmissions e.g. detecting that transmission power imbalance is above a threshold, which would cause degradation or performance loss on one or both links.

The additional information may indicate whether the radio frequency communication device 320 is capable of applying a specific mitigation technique (e.g. only prioritization between D2D and network (cellular) links) or all techniques which are pre-defined or configurable by the network node 310.

The additional information may indicate whether the radio frequency communication device 320 is capable of applying the mitigation technique(s) only for certain type of transmissions or physical channels or for all types of transmissions.

The radio frequency communication device 320 may be configured to send the above mentioned capability information to the network node 310 by proactively reporting without receiving any explicit request from the network node 310 (e.g. serving or any target network node).

The radio frequency communication device 320 may be configured to send the above mentioned capability information to the network node 310 by reporting after having received an explicit request from the network node 310 (e.g. serving or any target network node). Such an explicit request can be sent to the radio frequency communication device 320 by the network node 310 anytime or at any specific occasion. For example the request for the capability reporting can be sent to the radio frequency communication device 320 during initial setup or after a cell change (e.g. handover, RRC connection re-establishment, RRC connection release with redirection, PCell change in carrier aggregation (CA), primary component carrier (PCC) change in CA etc).

The network node 310 (e.g. serving eNode B, BS, positioning node, relay, network controller etc) may use the received radio frequency communication device capability information for performing one or more radio operational tasks. The radio operational tasks are related to interference handling at the radio frequency communication device 320 due to transmission power imbalance etc. In general the network node 310 may be configured to adapt the parameters related to resources assigned to the radio frequency communication device for transmission by the radio frequency communication device on D2D links and network (cellular) links. The network node 310 may also use the received radio frequency communication device capability information to select the most suitable mitigation technique(s) out of those supported by the radio frequency communication device 320. If the radio frequency communication device 320 does not support any mitigation technique(s) then network node 310 may refrain from configuring the radio frequency communication device 320 for transmitting on D2D and network (cellular) links simultaneously or the network node 310 may allow such transmission, but limit the maximum transmit power of the radio frequency communication device 320 to a certain limit on one or both links.

The capability information may also be stored by the network node 310. The network node 310 may then use the stored (historical) data for applying or selecting the most suitable rule for the corresponding radio frequency communication device at a future time.

The network node 310 may also be configured to forward the received radio frequency communication device capability information to other network nodes. Examples of other network nodes are neighbouring radio network nodes 310 (e.g. eNode B, BS, AP, BSC, relay etc), core network node (e.g. MSC, MME etc), O&M, OSS (Operations Support System), SON (Self Organized Network), positioning node (e.g. E-SMLC (EUTRAN Serving Mobile Location Centre), MDT (Minimization of Drive tests etc. This will avoid the need for the radio frequency communication device 320 to repeatedly signal its capability to a new serving network node after the cell change such as after a handover. In this way signaling overheads can be reduced.

In general, the teachings herein can be summarized as below, with simultaneous reference to FIG. 8 (in parenthesis). A first radio frequency communication device 320 is communicating with a network node 310 and second radio frequency communication device 325 simultaneously (800) for transmitting information or data. The radio frequency communication device 320 is configured to determine (810) that simultaneous transmission is to be made to the network node 310, possibly over a first set of radio resources via the radio frequency communication interface 130, and to the second radio frequency communication device, possibly over a second set of radio resources via the radio frequency communication interface 130. The first radio frequency communication device 320 then determines (820) that a first transmission parameter associated with simultaneous transmission to the Network node 310 and the second device does not fulfill a first requirement, in that there will be an imbalance of transmission power or other cause for causing transmission problems, such as from adjacent channel interference. The radio frequency communication device 320 adapts (840) at least one transmission parameter associated to the simultaneous transmission and transmits (850) information according to the updated transmission parameter.

The radio frequency communication device 320 is configured to determine a mitigation technique (840) in a number of different manners as will be disclosed below.

In one embodiment the first set of radio resources and the second set of radio resources belong to the same system frequency band.

In one embodiment the transmission parameter, on which the determination of the likelihood or presence of transmission problems is to be made, is a transmission power/Power spectral density imbalance between the D2D and network (cellular) transmission, an absolute transmission power level on respective D2D and network (cellular) transmission, and/or a total needed transmission power for simultaneous transmission for the first and second set of radio resources.

In one embodiment the RF communication device 320 is configured to adapt the transmission parameter(s) by adapting a transmission power/Power spectral density imbalance between the D2D and network (cellular) transmission, adapting an absolute transmission power level on respective D2D and network (cellular) transmission, adapting the total needed transmission power for simultaneous transmission for the first and second set of radio resources, and/or changing the resources (such as resource blocks) transmitted in the first or second set of resources.

In one embodiment the RF communication device 320 is configured to adapt the transmission parameter(s) by adapting transmitting resources so that the information to be transmitted is restricted, such as transmitting only PUCCH instead of PUSCH to the network node 310, and/or transmitting a fewer amount of PUSCH RBs to the network node 310.

In one embodiment the RF communication device 320 is configured to adapting the transmission power by setting the transmission (TX) power for the D2D transmission or for the network (cellular) transmission to substantially zero. The radio frequency communication device 320 may be further configured to base a determination of which of the D2D transmissions or the network (cellular) transmission's transmission power should be set to zero.

In one embodiment the RF communication device 320 is configured to adapt the transmission parameter(s) by adapting transmitting resources so that control data is prioritized over data blocks. The adaptation variations are all part of determining the mitigation technique (840).

The radio frequency communication device 320 may further be configured to report the adaptations made, or the problem with simultaneous transmission to at least one of the network node 310 and the second radio frequency communication device 325.

The disclosed embodiment provides consistent strategies for a radio frequency communication device handling problems that might arise due to transmission imbalance in case a radio frequency communication device, in network assisted D2D communication needs to transmit to both the network node 310 and to another radio frequency communication device in the same sub frame. The disclosed embodiments provide for an overall robustness in the radio frequency communication network (including both cellular and D2D communication).

In the description above there has been focus on an LTE system and OFDM, however the teachings herein are not limited to this case. Furthermore, the denominator network node may be an eNode B, node B, Base Station, wireless access point (AP), base station controller, relay, donor node controlling relay, base transceiver station (BTS), transmission points, transmission nodes, RRU (Remote Radio Unit), RRH (Remote Radio Head), nodes in distributed antenna system (DAS) etc. Furthermore, a radio frequency communication device may be an UE, sensor, lap top modem, smart phone, machine type (MTC) device, PDA, iPAD, Tablet, smart phone, laptop embedded equipped (LEE), laptop mounted equipment (LME), USB dongles etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A radio frequency communication device comprising a radio frequency communications interface and a controller, wherein said controller is configured to:
   establish network communication with a network node;
   establish device-to-device (D2D) communication with a second radio frequency communication device via said radio frequency communications interface;
   determine whether there is to be performed a simultaneous transmission comprising a network transmission at a network transmission power level over said network communication with said network node and a D2D transmission at a D2D transmission power level over said device-to-device communication with said second radio frequency communication device;
   determine if there is a transmission problem related to said simultaneous transmission based on a transmission power imbalance between the network transmission power level and the D2D transmission power level; and if so
   determine a mitigation technique; and
   perform said network transmission and said D2D transmission according to said mitigation technique to mitigate said transmission problem,
   wherein the transmission power imbalance relates to one or more of a transmission power/power spectral density imbalance between the D2D transmission power level and the network transmission power level, an absolute transmission power level imbalance between the D2D transmission power level and the network transmission power level, and a total needed transmission power for the simultaneous transmission,
   wherein said controller is configured to increase or decrease either or both of said network transmission power level and said D2D transmission power level, so that a difference between said network transmission power level and said D2D transmission power level is below a threshold level,
   wherein the increase or the decrease of either or both of said network transmission power level and said D2D transmission power level is applied during one or multiple transmission time intervals.

2. The radio frequency communication device according to claim 1, wherein said controller is configured to adapt said network transmission power level according to said mitigation technique.

3. The radio frequency communication device according to claim 1, wherein said controller is configured to adapt said D2D transmission power level according to said mitigation technique.

4. The radio frequency communication device according to claim 1, wherein said controller is configured to adapt both said network transmission power level and said D2D transmission power level.

5. The radio frequency communication device according to claim 1, wherein said controller is configured to adapt said network transmission power level and said D2D transmission power level by scaling.

6. The radio frequency communication device according to claim 1, wherein said controller is configured to restrict transmission on one of said network transmission power and D2D transmission power, by restricting information to be transmitted.

7. The radio frequency communication device according to claim 1, wherein said controller is configured to restrict transmission on one of said network transmission and said D2D transmission, by restricting information to be transmitted according to said mitigation technique.

8. The radio frequency communication device according to claim 1, wherein said controller is configured to prioritize one of said network transmission and said D2D transmission, and only perform the prioritized transmission according to said mitigation technique.

9. The radio frequency communication device according to claim 8, wherein said controller is configured to prioritize a transmission of a signal or prioritize a physical channel which carries control information according to said mitigation technique.

10. The radio frequency communication device according to claim 1, wherein said mitigation technique is based on pre-defined rules stored in a memory comprised in said radio frequency communication device.

11. The radio frequency communication device according to claim 10, wherein said pre-defined rules relate to at least one of a condition of said radio frequency communication device, the transmission power imbalance, which is a difference in log scale or ratio in linear scale of power transmitted by the radio frequency communication device for the network transmission and device-to-device communication with a second radio frequency communication device, and a triggering event.

12. The radio frequency communication device according to claim 11, wherein said controller is configured to transmit at least one of capability information of said radio frequency communication device, which capability information indicates that the radio frequency communication device is capable of performing said network transmission and said D2D transmission according to one or more mitigation techniques to mitigate the transmission problem, and a measurement report to said network node for said network node to base a selection of said mitigation technique on.

13. The radio frequency communication device according to claim 1, wherein said controller is configured to determine said mitigation technique by receiving said mitigation technique or information associated with said mitigation technique from said network node.

14. The radio frequency communication device according to 1, wherein said controller is configured to receive an indication or message from said network node, and in response thereto determine said mitigation technique.

15. The radio frequency communication device according to claim 1, wherein said controller is configured to determine if there is a transmission problem related to said simultaneous transmission by determining if there is a likelihood for such a problem.

16. The radio frequency communication device according to claim 1, wherein said controller is configured to transmit a report to said network node, wherein said report includes said mitigation technique or said transmission problem.

17. The radio frequency communication device according to claim 1, wherein said controller is configured to transmit a report to said second radio frequency communication device, wherein said report includes said mitigation technique or said transmission problem.

18. The radio frequency communication device according to claim 1, wherein said controller is configured to detect an event and in response thereto update said mitigation technique.

19. A method for use in a radio frequency communication device comprising a radio frequency communications interface and a controller, said method comprising:
    establishing network communication with a network node;
    establishing device-to-device (D2D) communication with a second radio frequency communication device via said radio frequency communication interface;
    determining whether there is to be performed a simultaneous transmission comprising a network transmission at a network transmission power level over said network communication with said network node and a D2D transmission at a D2D transmission power level over said device-to-device communication with said second radio frequency communication device;
    determining if there is a transmission problem related to said simultaneous transmission by determining a transmission power imbalance between the network transmission power level and the D2D transmission power level for the said simultaneous transmission; and if so
    determining a mitigation technique to mitigate said transmission problem; and
    performing said network transmission and said D2D transmission according to said mitigation technique to mitigate said transmission problem,
    wherein the transmission power imbalance relates to one or more of a transmission power/power spectral density imbalance between the D2D transmission power level and the network transmission power level, an absolute transmission power level imbalance between the D2D transmission power level and the network transmission power level, and a total needed transmission power for the simultaneous transmission,
    wherein said controller is configured to increase or decrease either or both of said network transmission power level and said D2D transmission power level, so that a difference between said network transmission power level and said D2D transmission power level is below a threshold level,
    wherein the increase or the decrease of either or both of said network transmission power level and said D2D transmission power level is applied during one or multiple transmission time intervals.

20. A non-transitory computer readable storage medium encoded with instructions that, when loaded and executed on a processor, causes the method according to claim 19 to be performed.

21. A network node comprising a radio frequency communications interface and a controller, said network node being configured to serve at least one first radio frequency communication device being configured for both network communication at a network transmission power level and device-to-device (D2D) communication at a D2D transmission power level with a second radio frequency communication device, wherein said controller is configured to:
    determine if the first radio frequency communication device has a transmission problem related to a transmission power imbalance between the network transmission power level and the D2D transmission power level related to simultaneous transmission for both network communication and device-to-device communication with the second radio frequency communication device; and
    determine a mitigation technique to mitigate said transmission problem; and
    transmit said mitigation technique to said first radio frequency communication device using one or more radio frequencies,
    wherein the transmission power imbalance relates to one or more of a transmission power/power spectral density imbalance between the D2D transmission power level and the network transmission power level, an absolute transmission power level imbalance between the D2D transmission power level and the network transmission power level, and a total needed transmission power for the simultaneous transmission,
    wherein said controller is configured to increase or decrease either or both of said network transmission power level and said D2D transmission power level, so that a difference between said network transmission power level and said D2D transmission power level is below a threshold level,
    wherein the increase or the decrease of either or both of said network transmission power level and said D2D transmission power level is applied during one or multiple transmission time intervals.

22. The network node according to claim 21, wherein said controller is further configured to determine said transmission problem based on a difference in log scale or ratio in linear scale of power transmitted by the first radio frequency communication device for the network transmission and device-to-device communication with the second radio frequency communication device.

23. The network node according to claim 21, wherein said controller is further configured to determine said mitigation technique based on pre-determined rules.

24. The network node according to claim 21, wherein said controller is further configured to receive at least one of a capability information, which capability information indicates that the first radio frequency communication device is capable of performing said network transmission and said D2D transmission according to one or more mitigation techniques to mitigate the transmission problem, a measurement report and an indication of a detected problem from said first radio frequency communication device and to determine said mitigation technique based on said received at least one received capability information, measurement report or indication of a detected problem.

25. The network node according to claim 24, further comprising a memory, and wherein said controller is further configured to store said capability of said first radio frequency communication device for future use.

26. The network node according to claim 24, wherein said controller is further configured to transmit said capability of said first radio frequency communication device to a second network node.

27. The network node according to claim 21, wherein said controller is further configured to perform a measurement and generate a measurement report and to determine said mitigation technique based on said generated measurement report.

28. The network node according to claim 21, wherein said controller is further configured to perform a radio operational task, wherein said radio operational task comprises adapting at least one parameter related to resources assigned to said first radio frequency communication device for transmission over one of or both of a transmission to said network node or said second radio frequency communication device.

29. The network node according to claim 21, wherein said controller is further configured to detect an event and in response thereto update said mitigation technique.

30. A method for use in a network node configured to serve at least one first radio frequency communication device being configured for both network communication and device-to-device (D2D) communication with a second radio frequency communication device, said method comprising:
    determining if the first radio frequency communication device has a transmission problem related to a transmission power imbalance between a network transmission power level and a D2D transmission power level related to a simultaneous transmission for both network communication and device-to-device communication with the second radio frequency communication device;
    determining a mitigation technique to mitigate said transmission problem; and
    transmitting said mitigation technique to said first radio frequency communication device using one or more radio frequencies,
    wherein the transmission power imbalance relates to one or more of a transmission power/power spectral density imbalance between the D2D transmission power level and the network transmission power level, an absolute transmission power level imbalance between the D2D transmission power level and the network transmission power level, and a total needed transmission power for the simultaneous transmission,
    wherein said controller is configured to increase or decrease either or both of said network transmission power level and said D2D transmission power level, so that a difference between said network transmission power level and said D2D transmission power level is below a threshold level,
    wherein the increase or the decrease of either or both of said network transmission power level and said D2D transmission power level is applied during one or multiple transmission time intervals.

* * * * *